Sept. 18, 1945.  D. M. SMITH  2,385,167
WEED PULLER
Filed April 17, 1943  2 Sheets-Sheet 1
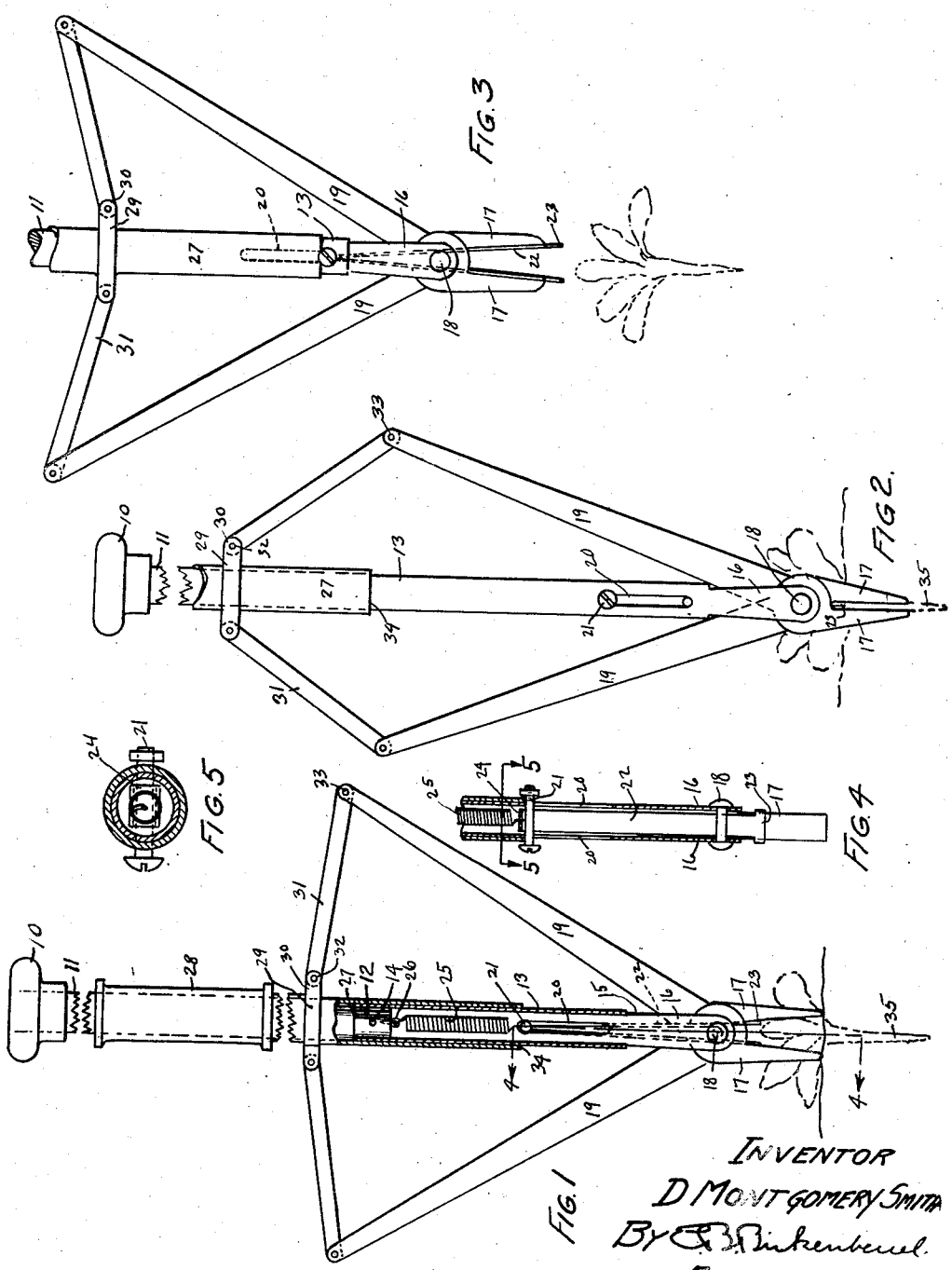
INVENTOR
D MONTGOMERY SMITH
BY ...
ATTORNEY Sept. 18, 1945.　　　D. M. SMITH　　　2,385,167
WEED PULLER
Filed April 17, 1943　　　2 Sheets-Sheet 2
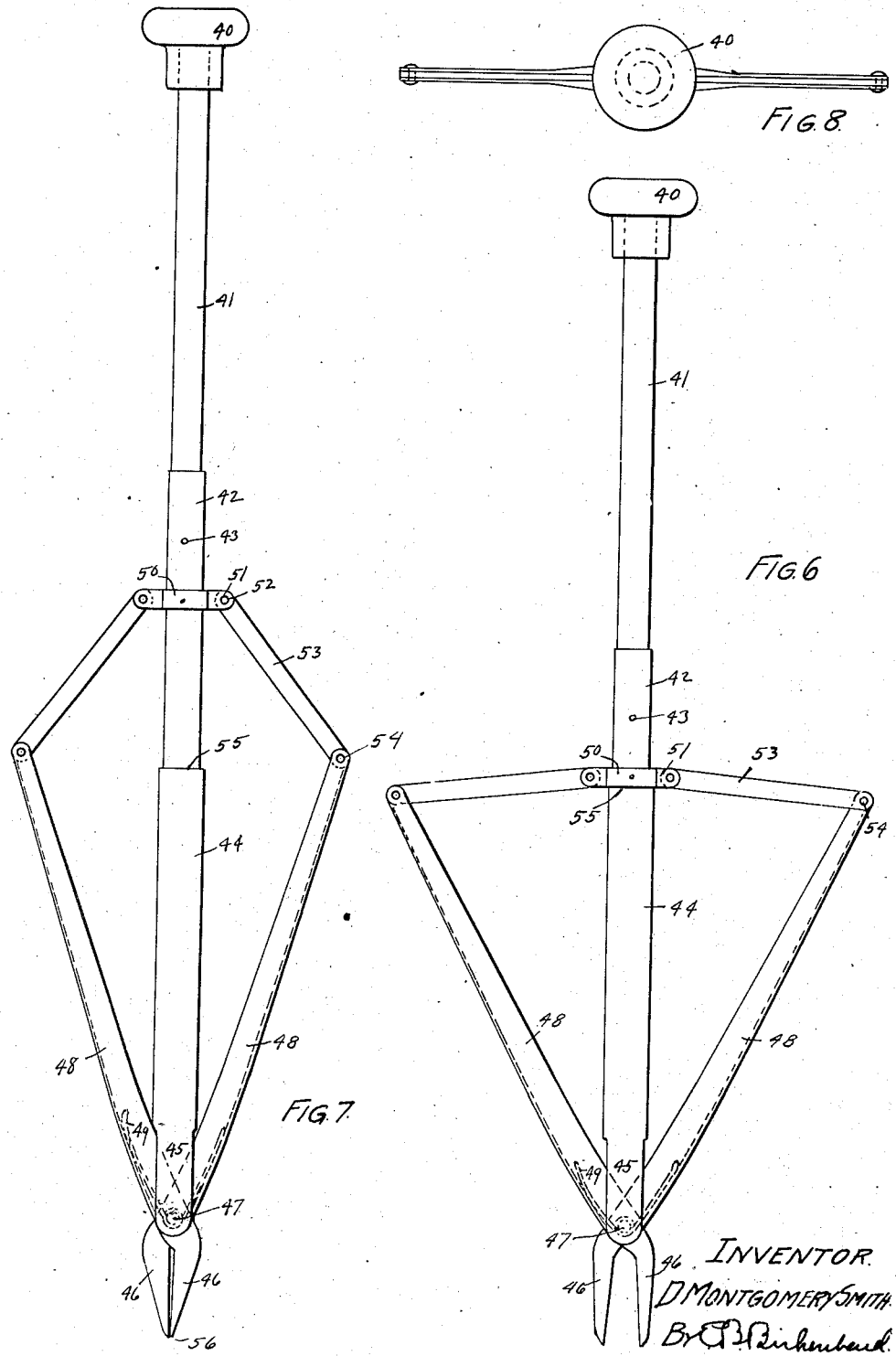

Patented Sept. 18, 1945

2,385,167

UNITED STATES PATENT OFFICE 2,385,167

WEED PULLER

D Montgomery Smith, Portland, Oreg.

Application April 17, 1943, Serial No. 483,380

1 Claim. (Cl. 294—50.5)

This invention relates generally to garden tools, and particularly to a weed puller.

The main object of this invention is to provide a weed puller which will be easy to manufacture, easy to operate, which will not make a large hole in the ground, and which will be especially adapted for withdrawing tap roots of deep growing weeds.

The second object is to provide a weed puller of the class described with an ejector.

I accomplish these and other objects in the manner set forth in the following specification as illustrated in the accompanying drawings, in which:

Fig. 1 is a side elevation of the preferred form of the device showing the puller jaws open and ready to enter the ground around a weed.

Fig. 2 is a view similar to Fig. 1, but showing the position of the parts when the weed puller is inserted into the ground, and also as the weed is withdrawn.

Fig. 3 is a fragmentary view showing the position of the parts during the ejection operation.

Fig. 4 is a fragmentary section taken along the line 4—4 in Fig. 1.

Fig. 5 is an enlarged transverse section along the line 5—5 in Fig. 4.

Fig. 6 is a side elevation of a simplified form of the invention showing the parts in position to be inserted into the ground.

Fig. 7 is a view similar to Fig. 6 showing the jaws closed, ready to pull a weed.

Fig. 8 is an end elevation of Fig. 6.

Similar numerals refer to similar parts throughout the several views.

Referring in detail to the drawings, there is shown in Figs. 1 to 5, inclusive, a knob 10 on the end of the handle 11 whose lower end 12 is slightly reduced in diameter to receive the tubular stem 13 which is secured on the end 12 by means of a rivet 14.

The tube 13 has slots 15 formed in the sides thereof to produce the forked arms 16 between which are mounted the jaws 17 which are connected by the rivet 18 which is mounted on the forked members 16. The slots 15 provide clearance for the arms 19 of the jaws 17.

The tube 13 also has the slots 20 formed in the sides thereof to freely receive the transverse bolt 21 to which is attached the ejector 22 consisting of a U shaped spring member whose ends 23 normally lie between the jaws 17 as near as possible to the rivet 18 when in a retracted position; that is, when the bolt 21 is at the end of the slots 20 farthest from the jaws 17. The end 24 is curled around the bolt 21 in a manner to permit the bolt 21 to move the ejector 22 in either direction. A spring 25 is attached to the end 24 and to the screw eye 26 in the handle end 12. The purpose of the spring 25 is to urge the ejector 22 toward a retracted position.

Slidably mounted on the tube 13 is a sleeve 27 on one end of which is secured a hand grip 28, and near one end of which is secured a band 29 between whose forked ends 30 are mounted the links 31 which are hinged to the forked ends 30 by means of the rivets 32, and to the arms 19 by the rivets 33. The end 34 of the sleeve 27 rests against the bolt 21 due to the action of gravity when the parts are in the position shown in Figure 1, but the end 34 moves away from the bolt 21 when the parts are in the position shown in Fig. 2; that is, when the hand grip 28 is moved manually toward the knob 10, thereby closing the jaws 17 upon the weed tap root 35 as shown in Fig. 2. Then as the weed is withdrawn from the ground, the movement of the grip 28 away from the knob 10 brings the end 34 again into contact with the bolt 21, and a further movement causes the bolt 21 to move downwardly along the slots 20 and cause the ejector ends 23 to move outwardly to the position shown in Fig. 4, thereby completely ejecting the weed and removing whatever dirt may have been packed up within.

In the form of the device shown in Figs. 6, 7 and 8, the action is similar, but the ejector is eliminated. In this form of the device, the knob 40 is mounted on the handle 41 which extends into the tubular member 42 and is secured thereto by means of a rivet 43. The tube 42 is slidable within the sleeve 44 between whose forked ends 45 are mounted the jaws 46 on the rivet 47 which is supported by the forked arm 45.

The levers 48 are urged apart by means of the spring 49 which is attached to the rivet 47, and the spring 49 urges the jaws 46 toward an open position. A band clamp 50 is secured to the tubular member 42 and has connected to the forked ends 51 by means of the rivets 52 the connecting links 53 which are joined by the rivets 54 to the levers 48.

The operation of this form of the device is as follows:

In order to withdraw weeds, the parts are placed in the position shown in Fig. 6. That is, in which the spring 49 urges the band clamp 50 toward the end 55 of the tubular member 44. Pressure on the knob 40 will cause the jaw points 56 to enter the ground around the tap root of the weed. Now, as the knob 40 is pulled upwardly, the earth is holding the jaws 46 sufficiently to permit the reaction to cause the toggling action of the levers 48 and the links 53 to exert a great pressure against the jaws 46, and this pressure increases with the pull on the knob 40.

When the weed is withdrawn, it is only necessary to allow enough time for the spring 49 to reopen the jaws 46, permitting the weed to escape. If it does not fall out of its own accord, a slight shake will encourage it to leave the jaws 46.

It can be seen that the devices, although seemingly different, are yet quite similar in construction and in operation. Either can be operated with one hand, and both are extremely efficient in removal of deep growing weeds.

It will be noted that the ejector 22 is in the form of a spring and its ends 23 bear against the inner side of the jaws and serve to urge them apart.

It will also be noted that in both forms of the device, the weed engaging element is actually a pair of pliers, the jaws of which are manipulated by a long extension handle which is used to force the pliers into the ground.

I am, of course, aware that numerous forms of weed pullers have been constructed in the past. I therefore do not claim such devices broadly, but I do intend to cover all such forms and modifications thereof as fall fairly within the appended claim.

I claim:

A weed puller of the class described consisting of a pair of weed engaging pliers including a pair of jaws and a connecting pivot, together with a pair of handles for actuating said jaws, a tubular stem disposed between said handles having a forked end attached to the plier pivot, a sleeve slidably mounted on said stem, toggle links connected to said sleeve and to the outer ends of said handles, a knob on the outermost end of said stem, a weed ejector mounted between the jaws of said pliers and extending upwardly into said stem, a bolt attached to the upper end of said weed ejector and extending through said stem, said stem being slotted to receive said bolt and permitting limited movement thereof, and a spring for urging said ejector toward a retracted position.

D MONTGOMERY SMITH.